US010687514B2

(12) United States Patent
Sheldon et al.

(10) Patent No.: US 10,687,514 B2
(45) Date of Patent: Jun. 23, 2020

(54) SYSTEM AND METHOD FOR ANIMAL DATA COLLECTION AND ANALYTICS

(71) Applicant: John Siegel, Grand Island, NY (US)

(72) Inventors: Derek Michael Sheldon, Reading, PA (US); Christopher Mackey, Alma (CA)

(73) Assignee: John Siegel, Grand Island, NY (US)

( * ) Notice: Subject to any disclaimer, the term of this patent is extended or adjusted under 35 U.S.C. 154(b) by 874 days.

(21) Appl. No.: 14/941,870

(22) Filed: Nov. 16, 2015

(65) Prior Publication Data

US 2016/0135431 A1    May 19, 2016

Related U.S. Application Data

(60) Provisional application No. 62/079,664, filed on Nov. 14, 2014.

(51) Int. Cl.
*A01K 27/00* (2006.01)
*H02J 7/00* (2006.01)
(Continued)

(52) U.S. Cl.
CPC .......... *A01K 27/006* (2013.01); *A01K 11/008* (2013.01); *A01K 27/00* (2013.01);
(Continued)

(58) Field of Classification Search
CPC .. A01K 27/001; A01K 27/009; A01K 29/005; A01K 15/021; A01K 11/008; A01K 11/006
(Continued)

(56) References Cited

U.S. PATENT DOCUMENTS

| 3,589,341 A | 6/1971 | Krebs |
| 5,454,350 A | 10/1995 | Betheil |

(Continued)

FOREIGN PATENT DOCUMENTS

| EP | 2241904 A1 * | 10/2010 | ............. G01S 19/34 |
| WO | 2015054308 A1 | 4/2015 | |

OTHER PUBLICATIONS

Supplementary European Search Report and European Search Opinion issued for EP Patent App. 15858187.6, dated May 24, 2018, 14 pp.

(Continued)

*Primary Examiner* — Peter M Poon
*Assistant Examiner* — Jeffrey R Larsen
(74) *Attorney, Agent, or Firm* — Zeller IP Group, PLLC; Kyle M. Zeller

(57) ABSTRACT

An inventive animal collar device is described herein that monitors location, physiological information and/or environmental information relating to an animal wearing the device. The collar may include multiple sensors and other electrical components embedded within the collar body that provide means for: tracking and monitoring an animal's activity and whereabouts, increasing visibility of the collar, and storing and retrieving animal, environment and system information. The collar may implement one or more wired or wireless communication devices so that the collar may transmit data to a connected computing device. The collar may also include one or more antennas to send and/or receive location information associated with the device. The collar may include a removable module that attaches to the collar via a module dock. The removable module may include any of the electronic components and may allow for the collar body to remain on the animal during information transfer and/or charging.

17 Claims, 6 Drawing Sheets

(51) Int. Cl.
*A01K 11/00* (2006.01)
*H02J 13/00* (2006.01)
*A01K 29/00* (2006.01)
*H02J 7/02* (2016.01)
*H04B 1/3827* (2015.01)

(52) U.S. Cl.
CPC .......... *A01K 27/001* (2013.01); *A01K 27/009* (2013.01); *A01K 29/005* (2013.01); *H02J 7/0047* (2013.01); *H02J 7/0063* (2013.01); *H02J 7/025* (2013.01); *H02J 13/0003* (2013.01); *H04B 1/385* (2013.01); *H04B 2001/3855* (2013.01)

(58) Field of Classification Search
USPC .................................................. 119/858, 863
See application file for complete search history.

(56) References Cited

U.S. PATENT DOCUMENTS

| | | | |
|---|---|---|---|
| 5,752,335 A | 5/1998 | Shimogori et al. | |
| 5,877,742 A | 3/1999 | Klink | |
| 5,955,953 A | 9/1999 | Hanson et al. | |
| 6,003,473 A | 12/1999 | Printz | |
| 6,067,018 A | 5/2000 | Skelton et al. | |
| 6,283,065 B1 | 9/2001 | Shorrock et al. | |
| 6,317,049 B1* | 11/2001 | Toubia | G01S 5/10 340/539.1 |
| 6,502,060 B1 | 12/2002 | Christian | |
| 6,568,354 B1 | 5/2003 | Wasserman et al. | |
| 6,721,681 B1 | 4/2004 | Christian et al. | |
| 6,970,090 B1 | 11/2005 | Sciarra | |
| 8,035,560 B1* | 10/2011 | Glodz | G08B 21/22 342/357.71 |
| 8,543,134 B2 | 9/2013 | Lopez et al. | |
| 2002/0050250 A1* | 5/2002 | Peterson | A01K 15/023 119/721 |
| 2002/0135487 A1 | 9/2002 | Bowling | |
| 2003/0040331 A1 | 2/2003 | Zhao | |
| 2003/0118979 A1 | 6/2003 | Axelrod | |
| 2003/0229452 A1 | 12/2003 | Lewis et al. | |
| 2005/0242137 A1 | 11/2005 | Fishman et al. | |
| 2006/0011144 A1 | 1/2006 | Kates | |
| 2006/0011145 A1 | 1/2006 | Kates | |
| 2006/0011146 A1 | 1/2006 | Kates | |
| 2007/0107669 A1 | 5/2007 | Eaton et al. | |
| 2007/0221140 A1 | 9/2007 | Warren et al. | |
| 2008/0079388 A1 | 4/2008 | Samowsky et al. | |
| 2012/0189156 A1 | 7/2012 | Leung | |
| 2012/0194976 A1* | 8/2012 | Golko | G06F 1/163 361/679.01 |
| 2012/0202427 A1 | 8/2012 | Gioscia et al. | |
| 2012/0214413 A1 | 8/2012 | Rose et al. | |
| 2012/0252486 A1 | 10/2012 | Lopez et al. | |
| 2013/0014706 A1* | 1/2013 | Menkes | A61D 13/00 119/859 |
| 2013/0042821 A1* | 2/2013 | Roberts | A01K 11/00 119/863 |
| 2013/0141237 A1 | 6/2013 | Goetzl et al. | |
| 2014/0180019 A1* | 6/2014 | Martinez | A61B 5/02055 600/301 |
| 2014/0275824 A1 | 9/2014 | Couse | |
| 2015/0099472 A1* | 4/2015 | Ickovic | H04B 1/385 455/66.1 |

OTHER PUBLICATIONS

"Tractive Pet Tracking," Web page, 1 page, Dec. 24, 2012, retrieved from Internet Archive Wayback Machine on Aug. 30, 2017.
"Tractive," Web page, 2 pages, Jan. 12, 2013, retrieved from Internet Archive Wayback Machine on Aug. 30, 2017.
"Whistle Activity Monitor," Web page, 11 pages, Jun. 9, 2013, retrieved from Internet Archive Wayback Machine on Aug. 30, 2017.
"Whistle Activity Monitor," Web page, 8 pages, Dec. 26, 2013, retrieved from Internet Archive Wayback Machine on Aug. 30, 2017.
PetPace Team, "Smart Collar for Dogs, Cats Enters European Union," PetPace's Blog!, Jul. 13, 2014, 12 pages.
International Search Report and Written Opinion issued for PCT/US2015/60813, dated Jan. 22, 2016, 10 pp.

* cited by examiner

SYSTEM AND METHOD FOR ANIMAL DATA COLLECTION AND ANALYTICS

CROSS-REFERENCE TO RELATED APPLICATIONS

The present application claims benefit of U.S. Provisional Patent Application 62/079,664, titled "SYSTEM AND METHOD FOR ANIMAL DATA COLLECTION AND ANALYTICS," filed Nov. 14, 2014, which is incorporated by reference herein in its entirety.

FIELD OF THE INVENTION

The present invention relates generally to wearable devices and, more particularly, to an animal collar for use in monitoring, storing, transmitting and/or receiving information related to an animal.

BACKGROUND

Pet owners have relied on many different devices and techniques to provide identification information for their pets in the event that a pet becomes separated and/or lost from its owner. Two well-known types of identification commonly used by pet owners are conventional engraved/imprinted tags and microchips; however, several drawbacks are associated with each of these types of identification.

Conventional tags are generally worn dangling from the pet's collar and are sized to be small to prevent the tag from being cumbersome to the pet. Based on the size of the tag, pet owners are only able to fit a small amount of information, such as the name of the pet and the owner's address and/or telephone number, on the tag itself. Conventional tags are also prone to becoming degraded and worn down, resulting in loss of information and frequent replacement. Using a conventional tag may initially be low in cost; however, having to replace the tag multiple times due to degradation and/or owner information changing increases the overall cost associated with providing this form of identification for a pet.

A microchip is another common form of identification that is used by pet owners to provide a permanent form of pet identification in addition to a conventional tag. A microchip implant is an identifying integrated circuit which uses Radio Frequency Identification (RFID) technology to provide a distinct identification number for the associated pet. It is highly recommended that microchip implantation be performed under the supervision of a licensed veterinarian professional due to the fact that the microchip is typically administered by subcutaneous injection on the dorsal midline of the pet. Microchips have become more widespread; however, they are still very limited in the amount of information that is provided regarding a lost pet. First, the microchip is only going to be useful if the pet is returned to an animal shelter or veterinarian's office where the microchip can be properly scanned. A common misconception about microchips is that the microchip allows for some sort of tracking mechanism, such as a Global Positioning System (GPS); however, this is not the case, as microchips only work when the chip is scanned by a scanner. Second, different manufacturers of microchips produce different types of microchips, which correspond to specific scanners. Unless a universal scanner is used, a microchip may not be picked up by a specific scanner, and the information provided by the microchip cannot be obtained. Third, microchips can move to different locations in the body once implanted, and since the microchip is not outwardly visible, it is difficult to ascertain whether a pet has been microchipped if the scanner is unable to locate the chip. Fourth, certain health risks and adverse reactions, while rare, can be associated with microchips in pets, given that they are subcutaneously implanted, such as cancerous growths at the site of injection.

In the field of pet identification, several advancements have been made to overcome the known deficiencies of conventional pet tags and microchips. For example, tags and collars containing battery powered displays for displaying and storing pet identification have been provided. Further, collars and tags including data communication means between the pet and the pet owner via radio frequency, GPS, and cellular network connectivity have also been provided to track and/or monitor a pet's movements, activity, and location. However, these advancements have created cumbersome collars which are heavy, complicated, and difficult to use, as well as still being limited in their abilities to track, monitor, and store pet information. Additionally, these collars are powered by either disposable batteries that can become costly to replace, or a charging component that requires the collar to be removed from the pet, creating the unnecessary hassle of detaching and reattaching the collar to the pet, leaving the pet vulnerable in the event of an emergency.

U.S. Patent Application Publication 2007/0221140 to Warren et al. discloses a pet collar having a digital pet information storage and retrieval device, comprising a Universal Serial Bus (USB) flash drive containing pet/owner data and information, which is retrieved once the USB flash drive is connected to a computer. While the pet owner is able to store significantly more information on a USB flash drive than a conventional tag, the pet collar of Warren is not able to provide any tracking information to help locate a lost or stolen pet. Additionally, the pet collar of Warren requires a computer having a USB port in order to retrieve any data provided by the USB flash drive.

U.S. Pat. No. 6,970,090 to Sciarra discloses a pet tracking collar comprising a battery operated electrical ribbon cable extending within the collar, which is connected to various light sources, an on/off switch, and an antenna and a radio transmitter. The pet collar of Sciarra offers an improvement to the conventional tags and microchips in that it has tracking capabilities via a radio frequency receiver which picks up the signals emitted by the transmitter on the pet collar; however, the pet collar of Sciarra does not provide any means for obtaining information on the lost pet or pet owner, such as name and contact information. Furthermore, the tracking capability of Sciarra is limited by the receiver's range—if a pet has strayed beyond the receiver's range, the owner has to move around until the receiver is able to pick up the signal of the transmitter in order to successfully locate the pet. Additionally, the pet tracking collar of Sciarra relies on a disposable battery, which is known in the art to require frequent replacement, which can lead to greater expenses for the pet owner.

U.S. Pat. No. 8,543,134 to Lopez et al. discloses an interactive communication and tracking dog collar having imbedded features that allow voice commands and tracking over long distances, along with features that facilitate tracking and visualization. The collar of Lopez comprises a cellular connectivity electronics module having a cellular phone antenna and means to transmit and receive voice transmissions through a cellular network; a GPS tracking unit which provides backup to cellular triangulation to provide tracking over long distances; a power supply; and wiring to a plurality of speakers, light sources, and a display. Although the pet tracking collar of Lopez provides improvements to conventional tags and microchips, it still has several flaws in its design and functionality. Retrieving and storing pet/owner data information, as well as charging the power supply, is done through an electrical power input and USB data connection at the base of the electronics housing. This means that in order to access, store, or modify pet/owner data information, and/or charge the power source for the collar, the user will need to physically remove the collar from the pet, and also have the correctly sized USB data connection cable and access to a computer which has a USB port. This creates the unnecessary hassle of having to detach and reattach the collar from the pet every time information needs to be accessed or the collar's power source needs to be recharged, leaving the pet vulnerable in the event of an emergency. Furthermore, having to physically remove the collar to access data and recharge the power source can be dangerous for an individual who has found a lost pet, given the pet's temperament and situation.

SUMMARY OF THE INVENTION

There is a need in the art to provide an wearable animal collar which overcomes the preceding disadvantages. Therefore, an object of the present invention is to provide a new and improved collar device which incorporates all of the advantages of the prior art and provides solutions for all of the known disadvantages of the prior art.

Embodiments described in the present disclosure provide systems, apparatus, computer readable media, and methods. Exemplary animal collars may employ one or more sensors and/or location tracking devices to measure, monitor and/or determine information such as animal information, environment information and/or system information. Such information may be stored in a memory of the collar, along with any information entered by a pet owner or other user associated with the animal. Any or all of the information may be easily retrieved and/or modified without having to remove the collar from the animal, using any number of communications devices.

The animal collar may employ location tracking technology, such as cellular antennas and a plurality of satellite antennas (e.g., a standard GPS network device and an Iridium Satellite network device).

In certain embodiments, the collar may include a rechargeable power source clip attachment and/or removable module that removably couple to the collar and can be charged independently from the collar. The collar may include an auxiliary power source contained therein so that the collar is fully functional and remains on the pet in the event a rechargeable power source is depleted or is detached for recharging.

In one embodiment a wearable collar apparatus for monitoring an animal is provided. the apparatus may include a collar body adapted to be worn about the neck of an animal. The collar body may include a first end and second end each having a complementary attachment means such that the first end is removably attached to the second end during wear. The collar body may also include an inner surface that faces an animal's neck during wear, the inner surface extending from the first end to the second end, and an outer surface that faces away from an animal's neck during wear. The outer surface may include a module dock disposed therein, the module dock adapted to receive a removable module therein. And, the module dock may include: a bottom wall; a first side wall extending from the outer surface of the collar body to the bottom wall; and a second side wall extending from the outer surface of the collar body to the bottom wall. In certain embodiments, at least one of the side walls has a physical attachment means adapted to interface with a complementary physical attachment means of a removable module, such that the module may be removably attachable to the collar body via the module dock. Moreover, at least one of the side walls may also include an electrical attachment means adapted to interface with a complementary electrical attachment means of a removable module such that, upon removably attaching a module to the dock, the module is placed in electrical communication with electrical components of the collar body via the electrical attachment. The collar apparatus may also include an internal housing having electronic components seated at least partially therein. The electronic components may include: a processor; an internal memory device in communication with the processor; a cellular communication device in communication with the processor and memory for receiving and transmitting location information; at least one satellite communication device in communication with the processor and memory for receiving and transmitting location information; one or more sensors in communication with the processor for monitoring one or more of: animal information, environment information and system information; a rechargeable battery in communication with the processor; and a plurality of lights in communication with the processor, the lights extending from the internal housing through the outer surface of the collar body.

In one embodiment, the collar apparatus further includes a removable module removably seated within the module dock of the collar body and in electrical communication with one or more of the electronic components of the collar body. The removable module may include a housing that has a first and second side wall; an outer surface extending from the first side wall to the second side wall; and an inner surface extending from the first side wall to the second side wall. The outer surface may include an activator and/or a display. The inner surface may include: a memory port adapted to receive a removable memory device therein; a rechargeable battery disposed within the housing; and one or more transceivers disposed within the housing, the transceivers adapted to communicate with a computing device. In certain embodiments, at least one of the side walls may have a physical attachment means adapted to interface with the physical attachment means of the module dock. Moreover, at least one of the side walls may have an electrical attachment means adapted to interface with the electrical attachment means of the module dock.

These and other aspects of the invention may be more clearly understood by reference to the following detailed description of the invention and the appended claims.

BRIEF DESCRIPTION OF THE DRAWINGS

The preferred embodiments of the present invention are illustrated by way of example and not limited to the following figures.

DETAILED DESCRIPTION OF THE INVENTION

Figure 1:
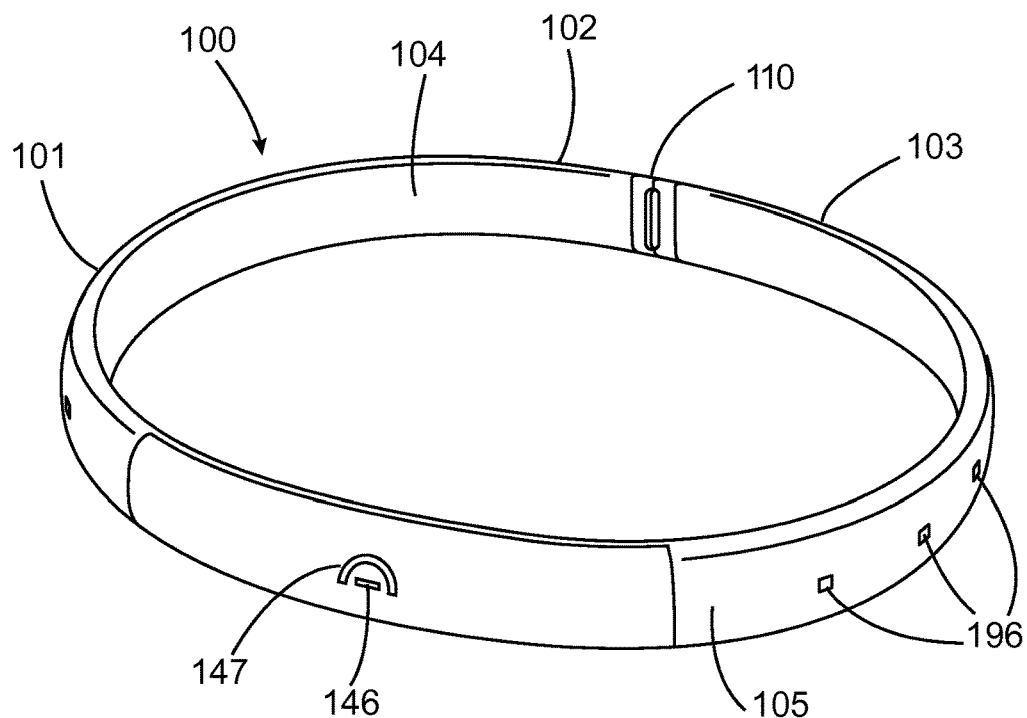
FIG. 1 is a front perspective view of an animal collar 100 according to an embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

The present inventions relate to a monitoring device and methods and techniques to collect and/or communicate information from embedded sensors, receivers, and/or external devices to other computing devices or other internet-viewable sources. More particularly, an inventive animal collar device is described herein that monitors location, physiological information and/or environmental information relating to an animal wearing the device.

The instantly described collar may comprise multiple electrical components embedded within the collar body that provide means for: tracking and monitoring an animal's activity and whereabouts, increasing visibility of the collar, and storing and retrieving animal, environment and system information.

The collar may implement one or more wired or wireless communication devices so that the collar may transmit real-time or stored data to a connected computer or mobile device. The collar may also comprise one or more antennas to send and/or receive location information associated with the device.

The collar may have a user interface directly on the device that indicates the state of one or more of the data available and/or being tracked. The device may also comprise an activator or button in communication with the display, the communication devices and/or other output devices (e.g., lights, speakers, vibration motor, etc.).

The collar device may comprise one or more sensors to collect, determine and/or report information relating to the animal. In one embodiment, the device is configured to collect, determine and/or report animal information such as but not limited to: identification information, health information, location information, motion or activity information, sleep information, and/or owner information. The device may also be configured to collect, determine and/or report environment information such as but not limited to ambient or relative: altitude, pressure, moisture, temperature, or light information.

In certain embodiments, the collar may comprise a removable power source that attaches to the collar and an auxiliary power source contained within the collar body. Accordingly, the collar need not be removed from an animal's neck to recharge its power supply. Rather, the removable power source may be charged independently from the collar, and the collar's auxiliary power source assures that the collar remains fully functional during recharging.

Generally, the collar may be employed to collect, measure, receive, store, calculate, display and/or transmit information, such as but not limited to animal information, environment information and/or system information. The information may be obtained via any of a number of included sensors and/or receivers and may be stored in memory and/or transmitted via one of the included communication devices incorporated therein.

Exemplary animal information includes, but is not limited to: identification information, health information, location information, movement or activity information, sleep information and/or owner information. Identification information may include information that may be used to identify an animal wearing the collar, such as but not limited to: name, age, birthday, unique animal ID, animal type, animal breed type, weight, height and/or temperament. Such information may be entered or selected by a user (e.g., an owner of the pet) via an online, mobile or desktop application.

Health information may include, but is not limited to: health records, animal temperature, heart rate, hydration, immunization reports, dietary preferences or requirements, past illnesses, grooming information (e.g., last groomed, preferred groomer) and veterinarian information. Veterinarian information may include such information as the name and contact information of a veterinarian responsible for treatment of the animal.

In one embodiment, the system may store default and/or user-defined ranges for allowable animal temperatures, hydration and/or heart rate. Such ranges may pertain to single measurements of such information or may pertain to a determined maximum, minimum and/or average of such information over a given time period. For example, the user may set a maximum animal temperature and the system may notify the user if that maximum temperature is reached exceeded. As another example, the user may set a heart-rate goal for the animal to obtain or exceed a particular heart-rate for at least 30 minutes in a given day. The system may notify the user about progress toward that heart-rate goal, including a notification that the goal was met. As yet another example, the user may define a minimum hydration over a given time period and the system may notify the user if that minimum hydration is not met. As discussed below, notification of a user may occur via collar lights, a display, and/or via an application running on the user's mobile device or computer.

Location information may include a current location of an animal, a home address of the animal, and/or a history of past locations of the animal over a predefined time period. As an example, current and/or past locations may be plotted on a map and stored in system memory.

In one embodiment, the system may store default and/or user-defined allowable locations. For example, a user may indicate that an animal is not allowed to travel to a specific location, outside of a specific area, and/or a certain distance away from a connected mobile device. Such allowed/prohibited locations may be time dependent (i.e., an animal can travel x feet away during the day, but y feet away at night)

or light-dependent (i.e., an animal can travel x feet away in a well-lit environment, but only y feet away in a dimly-lit environment). The system may notify the user if the animal travels to a prohibit location.

Movement or activity information may include, but is not limited to, a determination/indication of an animal's current movement; a history of movement over a predefined time period; minimum and/or maximum movement of an animal over a given time period; maximum and/or average speed of the animal; and/or type of movement. The system may also track a movement goal, defined as a certain amount of movement (e.g., walking/running) over a given time period. Accordingly, the system may indicate to an owner whether a tracked movement goal is met.

Sleep information may include, but is not limited to, a determination/indication that the animal is currently sleeping or awake; a history of sleep over a predefined time period; a minimum, maximum and/or average amount of sleep of an animal over a given time period; and/or quality of sleep over a given time period (i.e., fast-asleep, agitated, temporarily awake). The system may also track a sleep goal, defined as a certain amount of sleep over a given time period. Accordingly, the system may indicate to an owner whether a tracked sleep goal is met.

The system may also store owner information relating to the owner of a particular animal, including but not limited to: owner name, owner contact information (email, phone, address), owner picture etc. Such information may be made available to a user of the system, such as a person who finds a lost pet or a veterinarian who scans the collar during an appointment.

Exemplary environment information may include, but is not limited to, relative or absolute: gravity, pressure, moisture, temperature and/or light. Measured environmental information may be directly indicated to a user; processed to determine other information such as animal activity, motion and/or sleep; or used to activate and/or adjust the settings of a collar output device (e.g., lights, collar, vibration motor, and/or speakers).

System information may include, but is not limited to: battery status, user account information and user settings. Battery status may include a determination by the system of total battery power and percent battery power remaining. User account information may include a username, password and/or unique user ID for a particular user of the system.

Referring to FIG. 1, a front perspective view of an exemplary collar device 100 according to an embodiment is illustrated. As shown, the collar 100 comprises a collar body 101 having a first side 102 and a second side 103. The sides may be detachably connected to form an interface connection 110. When the first side 102 and second side 103 are attached, the collar body 101 forms a circular or oval shaped structure suitable for wear on the neck of a domesticated animal, such as a dog or cat.

The collar body 101 may comprise any diameter suitable for comfortable wear by an animal. For example, the collar body may comprise a diameter of between about 5 inches to about 35 inches. The collar may be made in multiple sizes to fit different animals and different sizes of a particular animal. In one embodiment, the collar may comprise a diameter of from: about 5 inches to about 10 inches (small animal); about 11 inches to about 15 inches (medium animal); about 16 inches to about 20 inches (large animal); about 21 inches to about 25 inches (extra large animal); or about 26 inches to about 35 inches (extra, extra large animal).

The collar body 101 may comprise a suitable width to hold any necessary electrical or mechanical components and for comfortable wear by an animal. For example, the collar body may comprise a width of about 0.5 to about 2 inches. Accordingly, the collar may comprise a weight of from about 0.5 to 1.5 pounds. It will be appreciated that both the width and weight of the collar will depend on the length thereof.

As shown, the collar body 101 comprises an inner surface 104 (i.e., a surface that faces the animal's neck when worn) and an outer surface 105 (i.e., a surface that faces away from the animal's neck when worn). The inner surface 104 and/or outer surface 105 may comprise any material having a desired strength, flexibility, durability, and cost. For example, the inner and outer surface may comprise one or more of the following materials: silicon rubber and other insulating organic materials, such as urethane rubber; thermoplastic elastomers; silicone; polyvinyl; polymer composites; rubber and other known rubber-like materials; and any equivalent material known in the art. The surface material may be hypoallergenic and/or waterproof.

In one embodiment, the inner surface 104 and outer surface 105 are made of the same material. In other embodiments, the inner surface may further comprise an anti-slip device to prevent slippage of the collar when worn (not shown). The anti-slip device may take the form of a material applied to the inner surface of the collar. Alternatively or additionally, the inner surface may comprise an anti-slip structure that engages the fur of the animal in order to prevent slipping. For example, the inner surface 104 may include a plurality of projections or depressions, such as small bumps, ridges, grooves, and/or divots. Optimally, any anti-slip coating or structure is configured so as not to create a risk of injury to the animal's skin.

The collar body 101 may comprise one or more of a variety of colors, including, but not limited to: white, red, orange, yellow, green, blue, purple, brown, black, and any known variations of the aforementioned colors. The color may be selected to optimize aesthetics of the collar and/or to increase the visibility of the collar.

Figure 2:
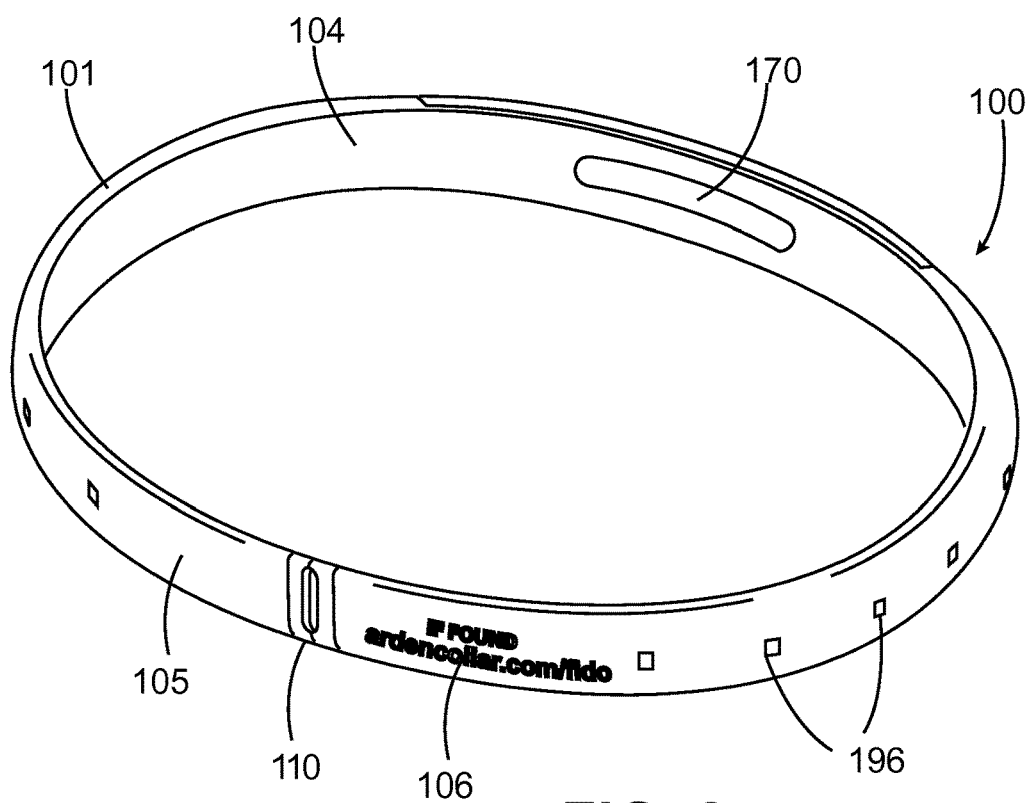
FIG. 2 is a rear perspective view of a collar 100 according to FIG. 1.

Referring to FIG. 2, a rear perspective view of the collar 100 according to FIG. 1 is illustrated. As shown, the collar body 101 may include a Universal Resource Locator (URL) 106 imprinted on the inner surface 104 or outer surface 105. The URL may provide an the address to a website that can be accessed by an animal owner or anyone who finds an animal wearing the collar. The URL can be engraved, debossed, embossed, or printed onto the surface of the collar body.

A website linked to the URL 106 may include any animal information, environment information or system information. In one example, the website may be publicly accessible and may contain any information that may be helpful to assist a finder of a lost animal to return it to its rightful owner.

In one embodiment, security may be implemented such that the URL 106 may only be accessed by entering a username and/or password. Alternatively or additionally, a pet owner may remotely select an option (e.g., "emergency mode") via a mobile app, website and/or desktop application to allow others to access the URL 106 without entering a username and password. This may be useful in a situation where a pet is lost and the owner wants a finder of the pet to be able to access the URL where the pet information is stored.

In another embodiment, each of the information contained on the website may be indicated as public or private. In this case, public information may be accessed without a password (e.g., by a finder of a lost animal) and private information may only be accessed by entering a password and/or other methods of authentication (e.g., by a pet owner or authorized third party).

Figure 3:
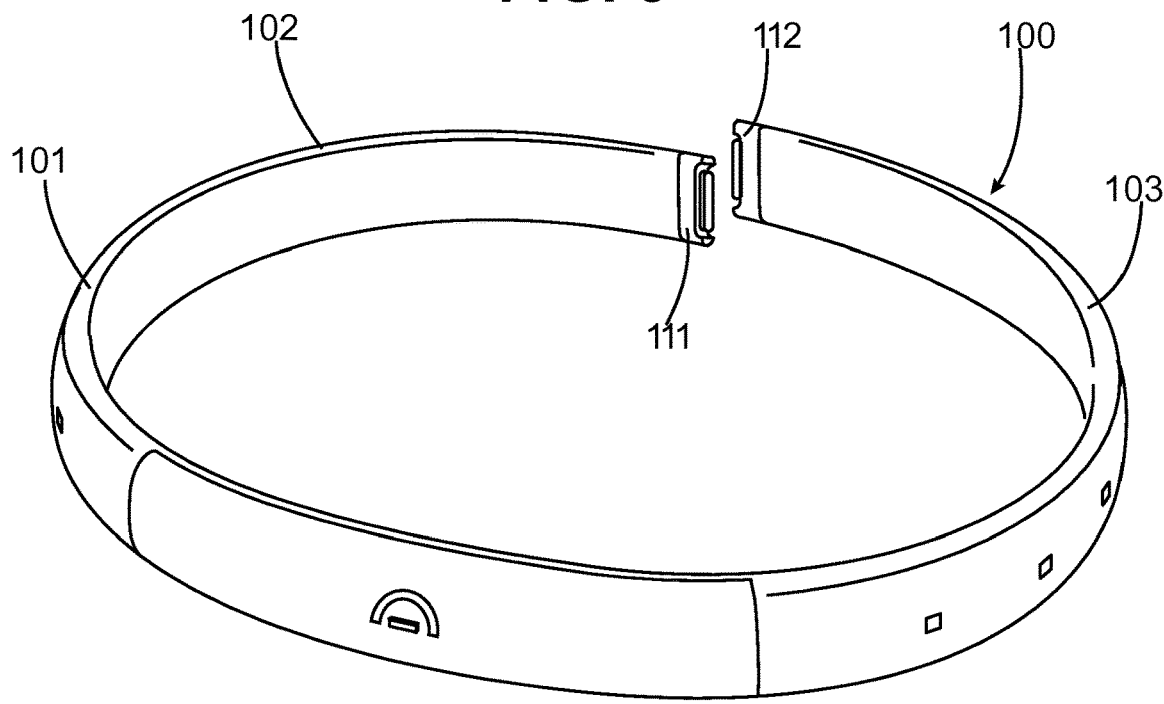
FIG. 3 is a front perspective view of a collar 100 according to FIGS. 1 and 2, where the first side 102 and second side 103 of the collar body 101 are detached.

Referring to FIG. 3, a front perspective view of the collar 100 according to FIGS. 1 and 2 is illustrated with the first side 102 and second side 103 of the collar body 101 in a detached state. As shown, each of the sides may comprise complementary attachment means (111, 112) at an end thereof.

The complementary attachment means (111,112) may be attached to form the interface connection (FIGS. 1 and 2 at 110). The interface connection allows for the collar ends to be detached and reattached so a human can secure the collar around the neck of animal. When attached, the interface connection may comprise a finger opening (i.e., an aperture) therein to allow a user to more easily disconnect the two ends (FIGS. 1 and 2 at 110).

Each of the complementary attachment means (111, 112) may comprise a metal or plastic housing fitted with a rare earth magnet. For example, each may comprise an aircraft-grade aluminum housing containing a neodymium magnet therein. In another embodiment, a samarium-cobalt magnet may be employed.

The interface connection 110 is selected to be strong enough to withstand the pulling force of an animal, while still allowing for detachment at strangulation pressure thresholds. The interface connection also allows for easy attachment and removal by an animal owner, while still being durable enough to withstand repeated attachment and detachment and use in inclement weather.

Although the illustrated embodiment shows complementary magnetic attachments (111, 112), it is noted that any suitable attachment mechanism may be employed, such as but not limited to: magnets, clips, pins, buckles, clasps, snaps, hinges, buttons, complementary track members, complementary threaded members, tongue and groove members, hook and loop, hook and eye, adhesives, any combination of such fasteners, and obvious fastener equivalents.

The collar body 101, integrated embedded electronic components (discussed below), and interface connection 110 may be manufactured using known injection molding techniques to create a solitary, one-piece, integrated construction. It is noted that known injection molding techniques using materials such as silicone rubber as the injected material often use a primer (adhesive) such as a silane coupling agent, which chemically reacts with the injected silicone rubber to create a firmly fixed chemical bond between the silicone rubber and the embedded electronic components. The collar may be manufactured using known injection molding techniques to create a solitary, one-piece, integrated construction using hypoallergenic silicon rubber as the injection molded material.

According to another embodiment, the collar body, integrated embedded electronic components, and interface connection can be manufactured using piecemeal construction, with the assembled collar body acting as an airtight housing for the electronic components.

An exemplary collar 100 may contain a number of electrical components disposed within a collar body 101 thereof to monitor, determine, transmit, receive and/or store the above-described information. Accordingly, portions of the collar body may comprise a hollow or semi-hollow internal housing with such electronics and/or electronic connections seated therein.

Figure 8:
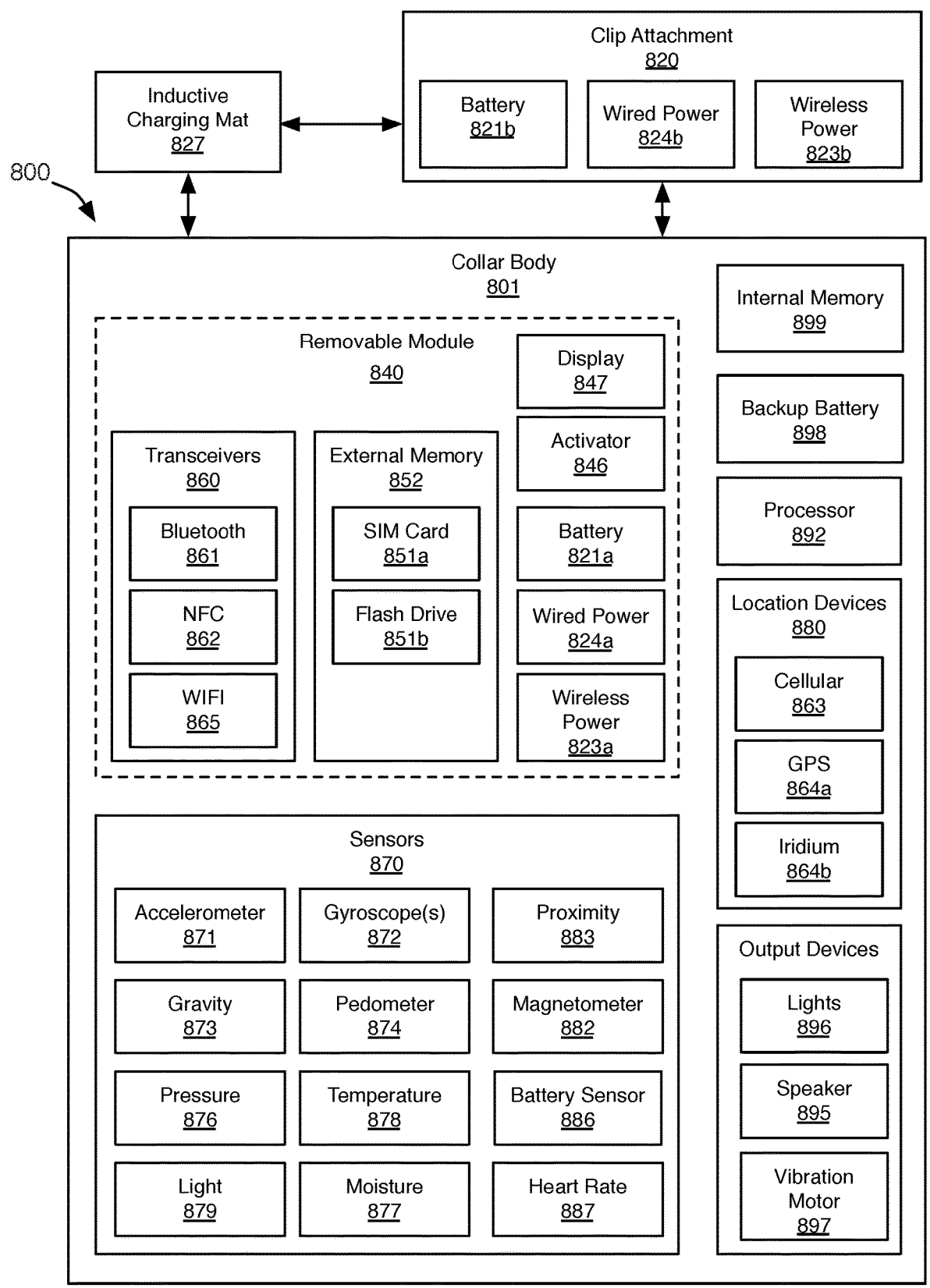
FIG. 8 is a block diagram of the animal collar 800 according to an exemplary embodiment.

Referring to FIG. 8, exemplary electronic components of a collar 800 may include, but are not limited to one or more: processors 892; memory devices 852, 899; sensors 870; user input devices 846 and/or displays 847; lights 896 and other output devices (e.g., speaker 895 and/or vibration motor 897); wired and/or wireless location devices 880; transceivers 860; a primary power source (821a, 821b), a secondary power source 898, a wired power/data connection 824a, 824b and/or a wireless power connection 823a, 823b. Each of the electrical components may be housed within the collar body 801 and may be placed in communication with one another via wired or wireless electrical connections throughout the interior of the collar body. As discussed in detail below, any number of the electronic components may additionally or alternatively be disposed within a removable module 840 and/or a power source clip attachment 820.

The collar 800 may include one or more processors (or microprocessors) 892. For example, an independent application processor may be used to store and execute applications that utilize sensor data acquired and/or processed by one or more sensor processors (i.e., processor(s) that process data from physiological, environmental and/or activity sensors). In the case where there are multiple sensors, there may also be multiple sensor processors. An application processor may have sensors 870 directly connected to it as well. Sensor and application processors may exist as separate discrete chips or exist within the same packaged chip (multi-core). A collar device may have a single application processor, or an application processor and sensor processor, or a plurality of application processors and sensor processors.

The collar 800 also includes internal memory 899 or external memory (852, 851a, 851b) in communication with the processor 892 such as but not limited to, NAND flash, NOR flash, flash on another processor, other solid-state storage, mechanical or optical disks, and/or RAM. The memory 852, 899 may store any of the information described herein, such as but not limited to animal information, environment information, and/or system information. Flash memory lends itself to applications such as the present in that it has good shock resistant characteristics and may retain stored data without the need for an active power source.

The memory 852, 899 may store executable code or instructions for one or more applications. When an application is requested to be executed, the processor retrieves corresponding executable code and/or data (e.g., animal information, images, video, audio, etc.) from the memory and executes it. The executable code can be temporarily or permanently stored on the memory or storage of the application processor.

The collar 800 may comprise one or more sensors 870 (FIG. 2 at 170) to acquire animal information, environment information and/or system information. Each of the sensors 870 is electrically connected to the processor 892, optionally via a separate sensor processor.

The types of sensors 870 that may be included in the collar 800 are outlined in the table below along with corresponding information that may be acquired with each sensor and potential usage of such information. All combinations and permutations of animal, environment and system sensors and/or information/usage types are intended to fall within the scope of the present inventions.

TABLE

| Sensor | Information | Use |
| --- | --- | --- |
| Accelerometer 871 | Linear acceleration and orientation. | activity detection; sleep detection |
| Gyroscopes 872 | angular rotational velocity across three axes | activity detection; sleep detection |
| Pedometer 874 | steps taken by animal | activity detection; sleep detection |
| Magnetometer 882 | orientation | activity detection; sleep detection |
| Proximity Sensor 883 | proximity of near-by objects with respect to collar | output device activation or adjustment |
| Gravity Sensor 873 | gravity (relative or absolute) | activity detection; sleep detection |
| Pressure Sensor 876 | ambient pressure; pressure of collar on animal (relative or absolute) | activity detection; sleep detection |
| Moisture Sensor 877 | ambient or animal moisture (relative or absolute); rain or swimming detection | activity detection (swimming); rain detection |
| Temperature Sensor 878 | ambient or animal temperature (relative or absolute) | temperature; activity detection; sleep detection |
| Light Sensor 879 | ambient light (relative or absolute) | display and/or LED activation and settings |
| Heart Rate Sensor 887 | animal heart rate | activity detection; sleep detection; heart rate |
| Battery Sensor 886 | battery current, voltage and/or temperature | total battery power; percent battery remaining |

It will be appreciated that other types of sensors 870 may be employed to acquire the corresponding information. Additionally or alternatively, the device may derive the information from the corresponding sensor output data, but is not limited to the number or types of information that it could derive from the sensor. Other, non-listed sensors may be employed to measure or collect any of the described animal information, environment information and/or system information.

It will be further appreciated that any or all of the sensors may be employed to turn on/off or adjust any output devices present on the collar. Moreover, any or all of the sensors may be employed to produce a notification via an included or external display 847, speaker 895, LED 896, vibration motor 897 or via a mobile, web or desktop computer application.

Referring back to FIG. 2, one or more sensors 170 may be located on the inner surface 104 of the collar body 101 so that they are juxtaposed to an animal's neck during use. It will be appreciated that sensors may additionally or alternatively be present on the outer surface of the device or the interior thereof (not shown).

As discussed above, the inner surface 104 of the collar body 101 may include a protrusion that engages the animal's body with more force than the surrounding device body. In this embodiment, one or more sensors may form or be incorporated in a portion of the protrusion. Accordingly, when the device is attached to the animal's neck, the sensor may engage the neck, providing a more secure physical connection between the animal and the sensor. That is, a protrusion improves sustained contact between a sensor and the animal, which may increase the quality of measurements taken by the sensor.

In one embodiment, the inner surface 104 comprises a concave or convex shape to allow for one or more of the sensors on the inner surface to be closer to the animal during use. Such a configuration may improve the signal to noise ratio of one or more sensors.

The sensors 170 may be connected to the collar 100 via any attachment means, such as but not limited to: a pressure sensitive adhesive and a liquid gasket, screws, rivets, water-tight glues, hydrophobic membranes such as Gore-Tex, O-rings, sealant, grease, or epoxy to secure or attach the optical sensor package/module and the device body. In a preferred embodiment, the sensors may be attached, fixed, included and/or secured to the collar body (internal or external surface) via a liquid-tight seal (i.e., a method/mechanism that prevents liquid ingress into the collar body).

The collar 100 may include one or more methods of user interaction either locally or remotely. As shown, the collar includes an integrated activator 146 and a display 147 on its outer surface and connected to the processor. The illustrated activator and display comprise a single, integrated component in the form of an "A" shape.

In one embodiment, the activator 146 may comprise a physical button. The button may be disposed on a top surface (i.e., the top surface of the collar when it's in place around an animal's neck) along the outer surface 105 of the collar to facilitate activation by a user.

Figure 5A:
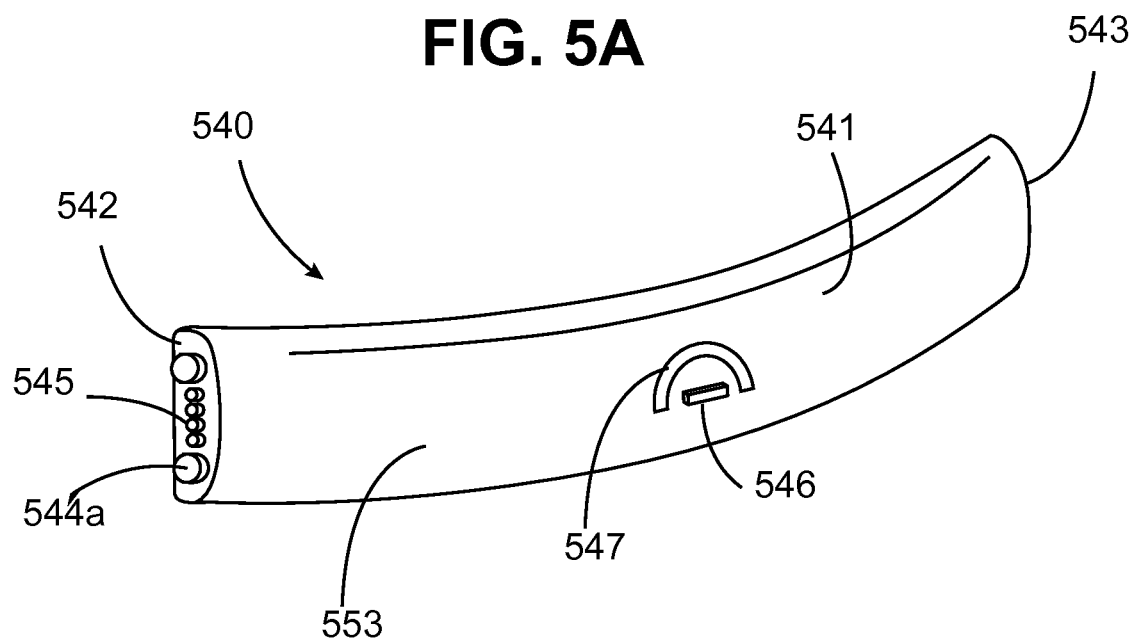
FIGS. 5A and 5B illustrate a front perspective view and rear perspective view, respectively, of an exemplary removable module 540 according to an embodiment.

The activator 146 can be located on any portion of the collar body 101, including but not limited to, the front, rear, or lateral sides thereof. According to an embodiment of the present invention, an "A" shaped button is located in the center of the collar body 101. According to another embodiment, an "A" shaped button is located on a removable module of the collar, as shown in FIG. 5A (discussed in detail below).

In one embodiment, the activator 146 may comprise or may be placed in communication with a light sensor (e.g., a photodiode) (see FIG. 8 at 879). Accordingly, the activator may be engaged by detecting a drop in incident light when a person's finger is placed over the button. In another embodiment, the activator may comprise or may be placed in communication with a proximity detector (see FIG. 8 at 883) such as, but not limited to an IR-based proximity detector and/or capacitive touch/proximity detector. Accordingly, the activator may be engaged by detecting a person's hand or finger placed in close proximity to the activator.

In any event, the activator 146 may be activated by the user to cause an action of the display 147 or any other output device of the collar (e.g., lights, speaker, vibration motor, etc.). The activator 146 may cause the display 147 or other output devices to display or indicate raw or calculated animal information, environment information and/or system information. For example, a user may press the activator button to cause the display 147 or lights 196 to indicate battery information (e.g., percent battery remaining). As another example, pressing the button may cause the system to turn one or more lights on or off.

In one embodiment, the activator may cause the system to connect to, download and/or transmit raw or calculated information to a mobile device or computer. Additionally or alternatively, activation of the activator may cause the system to take a measurement from one of the included sensors 170 and/or determine information by applying an algorithm to any raw information received from one of the included sensors. Such raw or calculated information may be transferred to a connected device or displayed via the display or lights of the system.

According to an embodiment of the present invention, the activator turns a blue color once connected to a compatible device and changes to a red color to indicate low battery life.

The physical embodiment of the display 147 may employ one or more display technologies including, but not limited to: LED, LCD, AMOLED, E-Ink, Sharp display technology, graphical display, and other display technologies such as TN, HTN, STN, FSTN, TFT, IPS, and OLET. In the illustrated embodiment, the display comprises one or more lights (e.g., LEDs) integral with the activator and connected to the processor.

The display 147 may be employed to indicate system status, animal information and/or environment information. For example, such information may be indicated through an LED's color, being on/off, an intermediate intensity, pulsing/flashing (and/or rate thereof), and/or a pattern of light intensities from completely off to highest brightness. Moreover, changes to such information may be indicated via similar methods.

The display 147 may show information acquired or stored locally on the device or could display information acquired remotely from other devices or Internet services. The device may use a sensor (for example, an ambient light sensor) to control or adjust brightness. For example, in dark lighting situations, the display may be dimmed to conserve battery life, whereas in bright lighting situations, the display may increase its brightness so that it is more easily read by the user.

It will be appreciated that the collar may comprise any number of activators and/or displays. Moreover, it will be appreciated that activators and displays may be present in a single, combined component (as shown) or may be separately located along the collar.

In one embodiment, the device may not comprise a display. Rather, raw or calculated information (acquired and/or stored) may be transmitted from the device to a computing device via a wired or wireless connection.

As shown, one or more lights 196 may be present about the outer surface of the collar body 101 and connected to the processor. The lights can be located within any portion of the collar body, including, but not limited to, the front, rear, and/or lateral sides thereof. According to an embodiment of the present invention, the lights are located on a lateral side of the collar body.

Animal visibility is critical in many situations, such as while an owner is walking their pet at night in dimly lit areas or if an escaped pet crosses a busy street. Accordingly, the lights 196 may be operated in any number of ways to maximize visibility. For example, the lights may be illuminated at all times during wear of the collar or may be automatically turned off when the collar is not in use. As another example, the lights may be manually turned on/off by manual activation of an activator, such as a button 146.

The lights may also be automatically or manually turned on/off, brightened/dimmed, and/or flashed, blinked or strobed in one or more colors depending on a status of one or more components of the system or the animal. More specifically, the collar may have one or more lighting modes comprising on/off state, timing sequence, brightness and/or color of each light. And each lighting mode may be triggered based on information (e.g., animal information, environmental information and/or system information) collected or determined by one or more components of the system.

As an example, the lights may be manually or automatically placed into an "emergency mode," where each of the lights are strobed in red and white colors alternating every second. The emergency mode condition may be manually triggered by an owner when they realize their pet has run away. Emergency mode may be automatically triggered when the animal leaves a designated geographical area (absolute area or distance from a connected device) and may further depend on the time of day/night. Other exemplary triggers of emergency mode include, but are not limited to, the detection by the system that the pet is swimming or that the pet is overheated.

As another example, the lights 196 may be automatically placed into a "low battery mode," such as when the power of one or more batteries (or the total power of all batteries) drops below a predetermined percentage (e.g., 20%, 15%, 10% or 5%). Upon entering low battery mode, the lights may be flashed every five seconds until the battery is replaced.

As yet another example, the lights may be brightened during specific hours or upon the detection of a low light atmosphere by a light sensor included on the collar or a connected mobile device.

While any type of light 196 may be implemented, high intensity light emitting diodes (HI LEDs) are preferred for their long lifetime, energy efficiency, and brightness. LEDs are bright enough to be visible during daylight hours and provide noticeable light sources that will help identify a pet, which increases safety for the pet and makes locating a lost or stolen pet easier. The lights may be of a single color or may be capable of producing multiple colors.

Referring back to FIG. 8, in one embodiment the collar comprise any number of speakers 895 integrated into the collar and connected to the processor 892. The speakers 895 may be employed to manually or automatically play an audio recording stored in memory and/or transmitted via a connected computing device. For example, a finder of a lost pet may press a button on the collar to play an audio recording containing information on how to return the pet. As another example, a pre-recorded message may be played through the speaker upon the occurrence of a condition (e.g., a recording of the owner saying "bad dog" may be played if an animal travels to a prohibited location).

In another embodiment, the collar 800 may further comprise one or more vibration motors 897 integrated into the collar and connected to the processor. The vibration motor 897 may be employed to manually or automatically vibrate the collar to get the animal's attention or as part of a training routine. As an example, the vibration motor may be activated upon the occurrence of a pre-defined condition, such as when the animal travels to a prohibited location.

The collar comprises several electronic components that are utilized to track the location of an animal 880. A cellular antenna 863, such as a CDMA or GSM-type cellular antenna may be embedded within the collar body and may communicate with a CDMA or GSM cellular network. The cellular antenna 863 may provide real-time location information, such as latitude and longitude coordinates. Moreover, the cellular antenna may allow for the device to send and/or receive information via the cellular network.

The collar further comprises one or more satellite antennas 864a, 864b, which work with the processor 892 to communicate with satellite networks. In one embodiment, the collar employs both a standard GPS network device 864a and an Iridium Satellite network device 864b connected to the processor 892. The Iridium Satellite network allows the collar to track an animal's location globally. These satellite network devices may provide real-time location information, such as latitude and longitude coordinates.

The location information obtained from the cellular antenna 863 and/or satellite network antennas 864a, 864b may be employed to track an animal, determine movement or activity information and/or to help locate a lost or stolen pet. Cellular location data may be transmitted/received to track an animal, even where satellite communication is not possible, such as underground or obscured by large objects. While cellular tracking is not as accurate as satellite tracking, the two technologies may be employed in tandem to assure accurate and consistent tracking of an animal.

The collar 800 may also be equipped with any number of wireless and/or wired communication devices 860 to send and/or receive information to a computing device. A unique feature of the collar is its ability to allow individuals to access and modify data stored in the memory 852, 899 without removing the collar from an animal. Accordingly, the collar employs an NFC chip 862 and/or a Bluetooth Low Energy (BLE) antenna 865 to communicate with computing devices in close proximity to the collar. Such technology allows for the direct transfer of stored and/or real-time information between the collar and the compatible device.

The collar may also comprise other wired, wireless, optical and/or capacitive mechanisms, including but not limited to USB 824, Lightning, Wi-Fi 865, Infrared, RFID and/or Zigbee technology. Such communication devices may be used to send and/or receive data between the collar and a connected computing device directly or via a network.

Compatible computing devices, such as smartphones and tablets, are ubiquitous and widely used for their user-friendly designs, portability, and convenience. The collar thus allows allows for a pet owner/finder to retrieve and/or modify important animal information, such as a contact number or home address, instantly and digitally, keeping all such information and records up-to-date and easily accessible.

The collar may comprise one or more power sources embedded within the collar body that can be utilized to power the electrical components. Exemplary power sources include, but are not limited to a primary advanced lithium ion (LiON) battery (821a, 821b) and a secondary or backup, low voltage LiON battery 898. In one embodiment, the primary battery (821a, 821b) has enough power to run the electrical components of the collar for between 5 and 20 hours until full depletion of the battery power source, and the backup battery 898 has enough power to provide 5-20 hours of emergency tracking, providing cellular and satellite network communication with a ping rate of about 40 pings per hour.

In certain embodiments, the primary and/or secondary batteries may be charged via an electrical power input port 824a. A user may detach the collar from an animal and connect it to a charger via a charging cable. In another embodiment, the primary and/or secondary batteries may be charged via a wireless charger (e.g., a charging mat 827) using any known inductive charging devices and techniques known in the art.

As discussed in detail below, the primary and/or secondary batteries may be housed within a removable attachment, such as a removable module 840 and/or rechargeable clip attachment 820. Accordingly, the removable attachment may be removed from the collar body 801 and charged, while leaving the collar body around the animal's neck.

Figure 4:
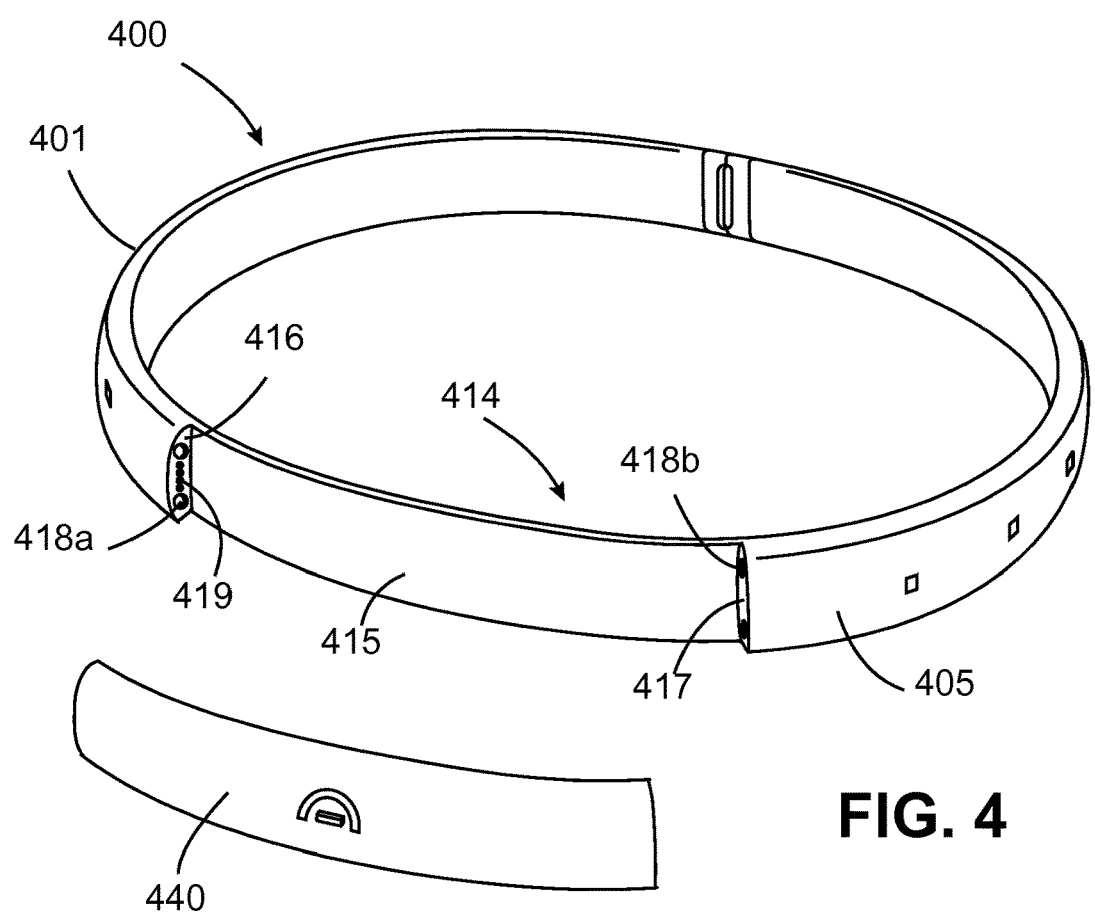
FIG. 4 is a front perspective view of a collar 400 according to an embodiment, wherein a removable module 440 is detached from a module dock 414 present on the collar body 401.

Referring to FIG. 4, a front perspective view of a pet collar 400 according to the invention is illustrated, wherein a removable module 440 is detached from a module dock 414 of the collar body 401.

As shown, the collar body 401 may comprise a module dock 414 adapted to receive a removable module 440. The module dock 414 may be defined by a groove or channel in the collar body having a defined depth. Accordingly, the module dock comprises a bottom, curved wall 415 that extends from a first side wall 416 to a second side wall 417.

Both the first and second side walls (416, 417) extend from the outer surface 405 of the collar body 401 to the dock's bottom surface 415. These walls may be sized and shaped such that they match the first and second sides of a removable module (discussed below). For example, the dock's first and second side walls may be substantially flat to match the substantially flat shape of the module's sides. In this way, a collar having a removable module disposed within the module dock of the collar body may appear as if it is a single piece, without noticeable gaps on either side of the module.

The removable module 440 is adapted to be physically and electrically attached to the collar body 401 via the dock 414. In one embodiment, the dock's first and/or second side walls comprise a physical attachment means (418a, 418b) for securely attaching the removable module to collar body 401. Such physical attachment means may be complementary to those present on the removable module. For example, both the physical connection means of the module dock (418a, 418b) and the removable module may be rare earth magnets, such as neodymium magnets (although either neodymium magnets or samarium-cobalt magnets can be used).

The physical attachment means (418a, 418b) is selected to be strong enough to prevent unwanted detachment of the module 440 during collar wear, while still allowing for detachment of the module 440 by a human. Although the illustrated embodiment comprises a complementary magnetic attachment, it is noted that any suitable attachment means may be employed, such as but not limited to: magnets, clips, pins, buckles, clasps, snaps, hinges, buttons, complementary track members, complementary threaded members, tongue and groove members, hook and loop, hook and eye, adhesives, any combination of such fasteners, and obvious fastener equivalents. In one embodiment, the physical attachment means may define a construction similar to a conventional wrist watch, with a pair of parallel extensions configured to removably receive a spring biased pin (and such pieces may additionally be magnetic).

The first side wall 416 and/or second side wall 417 of the dock 414 may also comprise an electrical attachment means 419 for electrically coupling the removable module to the electrical components of the collar body. The electrical attachment means 419 may be complementary to those found on the removable module. For example, both the electrical attachment means of the module dock and the removable module may comprise electric wire pins/leads.

Figure 5B:
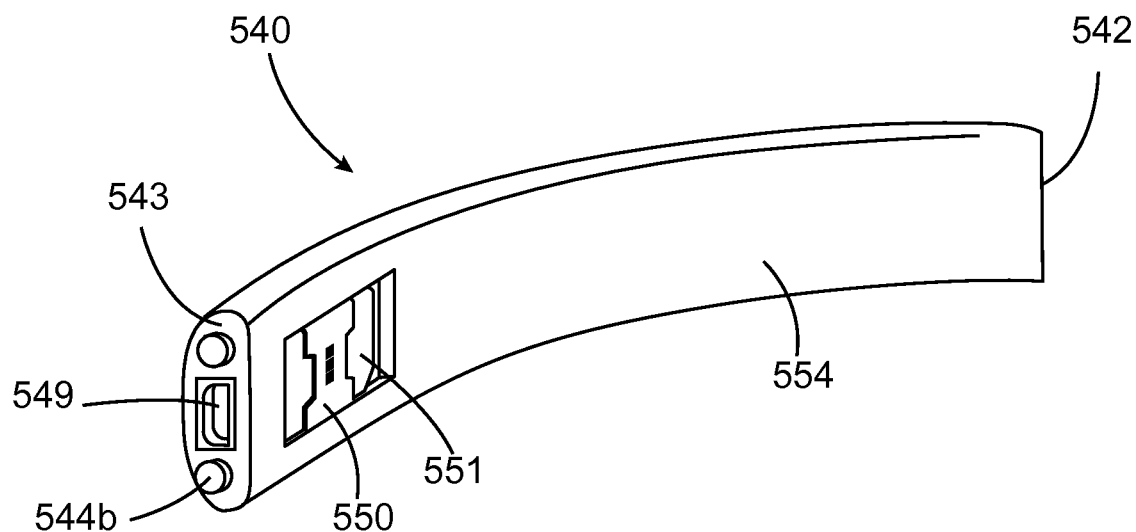

Referring to FIGS. 5A and 5B, an exemplary removable module 540 according to an embodiment is illustrated. As shown, the removable module 540 may be electrically and physically coupled to the collar body via, for example, a module dock present on the collar body (see FIG. 4).

The removable module 540 comprises a housing 541 adapted to hold a number of electrical components and to be coupled to the collar body. The housing 541 may comprises any shape and size to hold any necessary or desired electrical or mechanical components and to be suitable for comfortable wear by an animal. For example, the removable module may be formed such that, when the module 540 and collar body are attached, the combined unit forms a circular or oval shaped structure suitable for wear on the neck of a domesticated animal, such as a dog or cat (see FIGS. 1 and 2).

The housing 541 may comprise any material having a desired strength, flexibility, durability, and cost. Typically, the removable module will be made of the same or similar material as the outer surface of the collar body, such as but not limited to: silicon rubber and other insulating organic materials, such as urethane rubber; thermoplastic elastomers; silicone; polyvinyl; polymer composites; rubber and other known rubber-like materials; and any equivalent material known in the art. In one embodiment, the housing may be made from a plastic or metallic material and may comprise an outer cover selected from the above materials.

As shown, the housing 541 may comprise an outer surface 553 and an inner surface 554 connected via a first side 542 and a second side 543. The outer surface may be curved or otherwise shaped such that it matches the curvature and aesthetics of the outer surface of the collar body. Similarly, the inner surface may be curved or otherwise shaped such that it matches the curvature and aesthetics of the bottom wall of the module dock.

The first 542 and second sides 543 of the removable module 540 may be sized and shaped such that they match the first and second side walls of the module dock of the collar. For example, the first and second sides may be substantially flat to match the substantially flat shape of the module dock ends.

As discussed above, the removable module is adapted to be physically and electrically attached to the collar body. Accordingly, the first end 542 and/or second end 543 of the removable module comprises a physical attachment means (544a, 544b) for securely attaching the removable module to a collar body. Such physical attachment means may be complementary to those present on the module dock on the collar body (discussed above). The first and/or second end (542, 543) of the removable module 540 may also comprise an electrical attachment means 545 for electrically coupling the removable module to the electrical components of the collar body. The module electrical attachment means 545 may be complementary to the module dock electrical attachment means on the collar body.

Although the physical attachment means (544a, 544b) and electrical attachment means 545 of the removable module 540 and the module dock are illustrated as being separate, it will be appreciated that, in an alternative embodiment, such components may be a single, integrated component. Moreover, it will be appreciated that the physical and/or electrical attachment means may be present on one or more of the inner surface, outer surface, first end, and/or second end of the removable module.

The removable module 540 may contain a number of electrical components disposed therein. Accordingly, the housing 541 may be hollow or semi-hollow with such electronics and/or electronic connections disposed within.

As shown, the module may comprise an activator 546 and/or a display 547 on an outer surface 553 thereof. Such components are described in detail above and may be placed in electrical communication with the collar processor via the electrical attachment means of the removable module and the collar dock.

Indeed, any of the above described electrical components may be contained within the removable module, rather than (or in addition to) the collar body. For example the removable module may comprise one or more of the above-described components: processors; memory devices; sensors; user input devices; displays; lights and other output devices; wired and/or wireless communication devices; and batteries. Each of electrical components may be housed within the removable module and/or the collar body and may be placed in communication with one another via electrical connections when the removable module is attached to the collar via the module dock.

In the illustrated embodiment, a battery housed in the removable module may be charged via a USB port 549 or another power input port (not shown) present on a side surface 543, inner surface 554 and/or outer surface 553. A user may detach the removable module 540 from the collar and connect it to a charger via a USB charging cable (not shown). This allows the user to conveniently leave the collar on an animal's neck when charging the removable module.

In another embodiment, the battery may be charged using any known inductive charging devices and techniques known in the art. For example, some or all of the removable module housing may comprise a type of metal that is ferrous in properties (for example, a grade of stainless steel that is ferrous). Under this circumstance, the module 540 may be removed and then interconnect with an external wireless charger (e.g., a charging mat) using magnetic properties to secure it thereto.

In one particular embodiment, the removable module may comprise one or more external memory ports 550 on a surface thereof 554. The external memory port 550 may be adapted to receive a flash memory device and/or a subscriber identification module (SIM) card 551. The external memory device 551 may store any animal information, environment information and/or system information. Moreover, a SIM card may be employed to identify and authenticate a user for the above-mentioned cellular networks (GSM or CDMA) and/or satellite networks.

As shown, the removable module 540 may comprise a USB 549 or other port to allow for the physical connection of the module to a computing device. In this way, any real-time and/or stored information may be sent from the module to the computing device and/or received by the module from the computing device. Additionally or alternatively, the removable module 540 may implement any wireless communications technology (discussed above) so that when the removable module comes within range of a wireless base station or access point, any stored data may be manually or automatically uploaded to/downloaded from a paired computing device.

As an example, Android, Apple and Windows phones typically contain an NFC chip. By employing NFC technology, persons with a capable device may instantly and automatically be alerted to an animal's status and/or vital information. If the collar switches to "emergency mode" (automatically or through user input), a bystander within short range of an animal wearing the collar may receive an alert pushed to their mobile device (e.g., vibration and display of animal/owner information on the display of their device. As another example, a veterinarian will be able to place a compatible device within range of the collar and/or removable module to receive and/or transmit an animal's health information and records.

Referring to FIG. 8, an exemplary removable module 840 may comprise the following electrical components: a battery 821a, a USB or other charging/data port 824a, memory 852 (e.g., flash memory 851b and/or SIM card 851a), one or more transceivers 860 (e.g., Bluetooth 861, NFC 862 and/or WiFi 865), an activator 846 a display 847 (e.g. LED), and/or a wireless charging device 823a. Such components may be placed in electrical communication with each other via wired and/or wireless electrical connections.

Figure 6A:
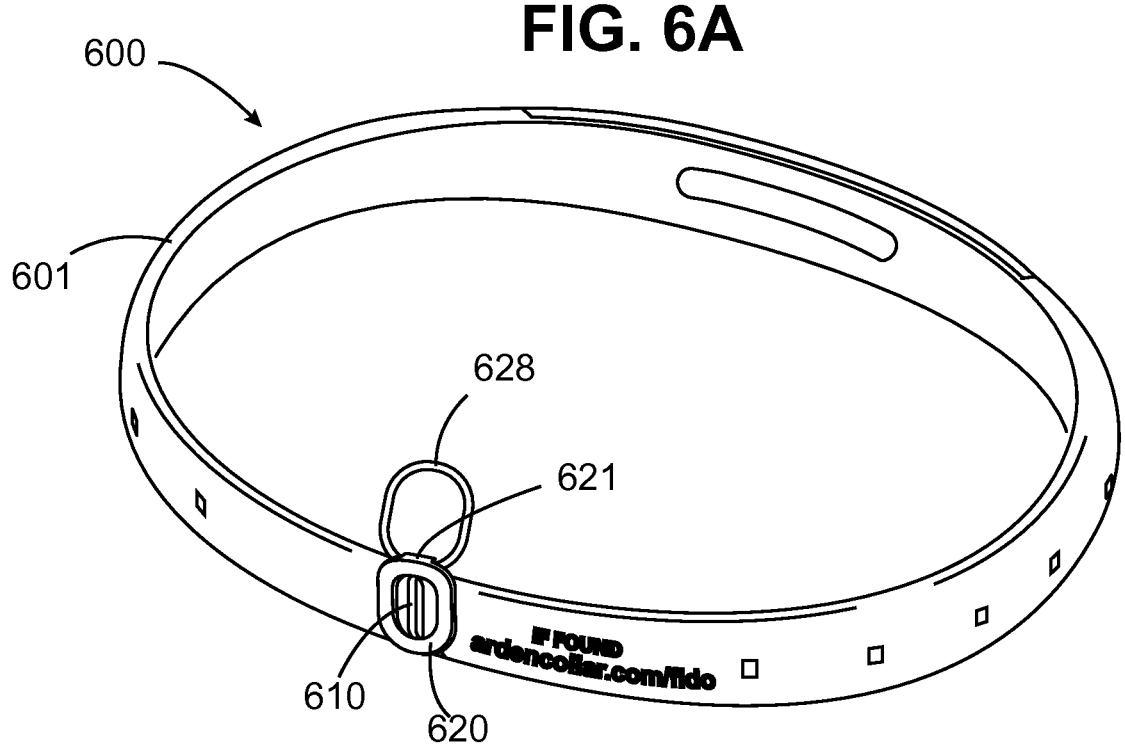
FIGS. 6A and 6B illustrate a rear perspective view and front perspective view, respectively, of a pet collar 600 according to an embodiment, where a rechargeable clip attachment 620 is connected to the collar via an interface connection 610.
Figure 6B:
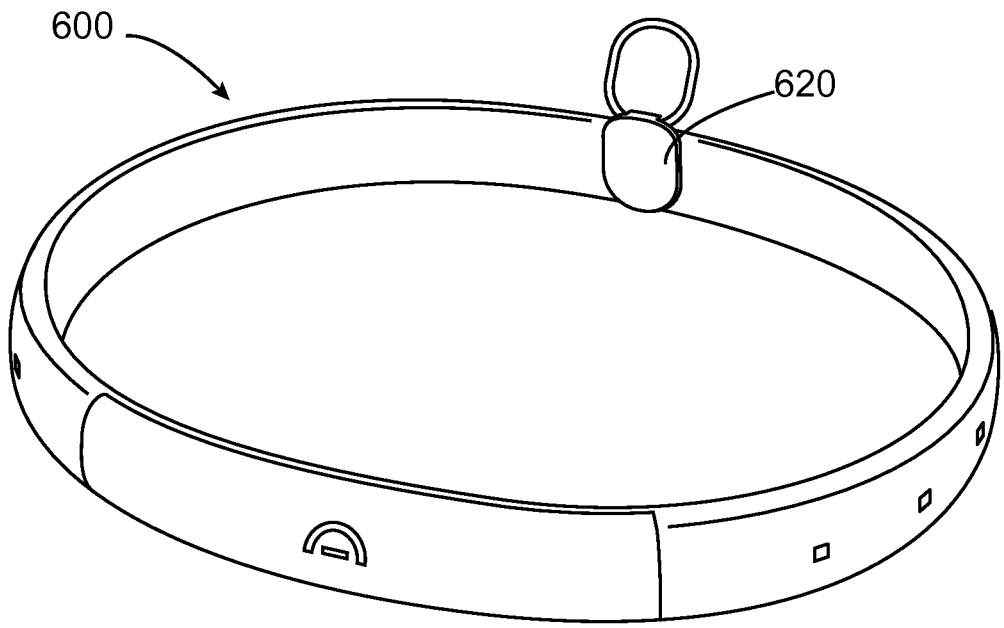

Referring to FIGS. 6A and 6B, an exemplary embodiment of an animal collar 600 is illustrated comprising a rechargeable power source clip attachment 620 connected to the collar via the interface connection 610.

In this embodiment, the rechargeable power source clip attachment 620 comprises a housing 621 having a rechargeable power source, such as a rechargeable battery, (not shown) disposed therein. Exemplary power sources include, but are not limited to, a rechargeable lithium ion (LiON) battery or a single-use battery.

As shown, the clip attachment 620 may be electrically and physically coupled to the collar body 601 via, for example, the interface connection 610. For example, both the connection means of the interface connection 610 and the clip attachment 620 may be rare earth magnets, specifically, neodymium magnets (although either neodymium magnets or samarium-cobalt magnets can be used). Once coupled to the interface connection, the clip attachment may provide additional power to the electrical components of the collar.

Some or all of the housing 621 of the clip attachment 620 may consist of a metal material (for example, steel, stainless steel, aluminum, magnesium, or titanium). Such a configuration may provide a structural rigidity. In one particular embodiment, the housing may be designed to be hypoallergenic through the use of a hypoallergenic "Nickel-Free" stainless steel.

Moreover, some or all of the housing 621 comprises a type of metal that is ferrous in properties (for example, a grade of stainless steel that is ferrous). Under this circumstance, the clip attachment 620 may be removed and then interconnect with an external wired or wireless charger (e.g., a charging mat) using magnetic properties to secure thereto. It will be appreciated that the clip attachment can be charged on a charging mat using any known inductive charging devices and techniques known in the art.

In another embodiment, the power source may be charged via an electrical power input port present on the clip attachment housing (not shown). A user may detach the clip attachment from the collar and connect it to a charger via a charging cable.

In one embodiment, the clip attachment 620 further comprises a leash connection 628, which is secured to the clip attachment housing 621, for connecting a standard leash (not shown) to the collar 600. The coupling between a leash and the collar, through the leash connection 628, the clip attachment 620 and the interface connection 610, is secure enough to be able to withstand a pulling force at least equal to 95% of all known dog breeds on Earth before failure. For example, the connection between the leash and collar is able to withstand a pulling force of 990 PPSI per second (the pulling force of a Great Dane dog breed).

Referring back to FIG. 8, an exemplary clip attachment 820 may comprise a battery 821b, a USB or other wired charging port 824b, and/or a wireless charging device 823b. Such components may be placed in electrical communication with each other via wired and/or wireless electrical connections.

Figure 7:
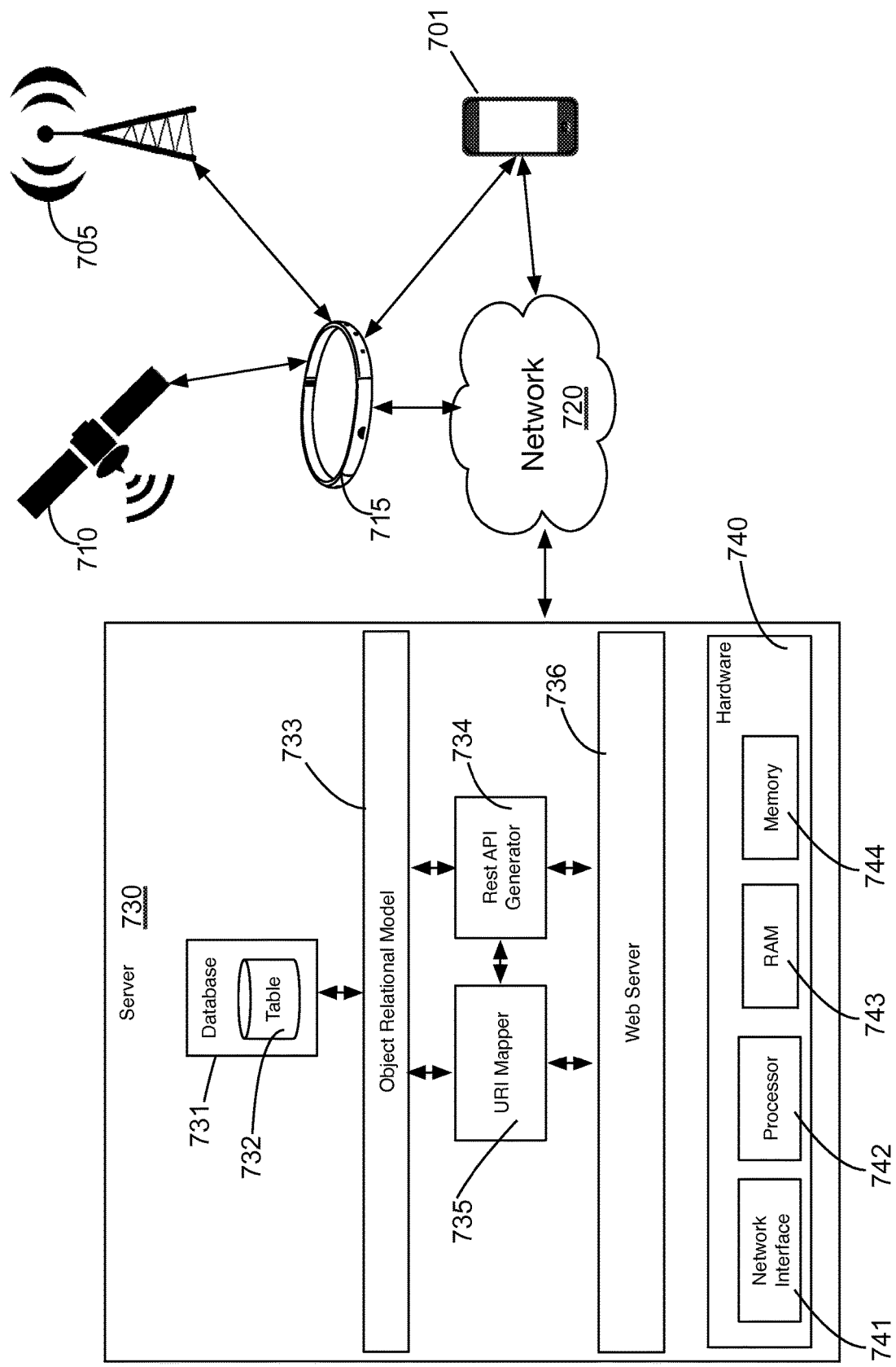
FIG. 7 shows a system architecture according to an exemplary embodiment.

Referring to FIG. 7, an exemplary system for monitoring, storing, transmitting and/or receiving animal information, environment information and/or system information is illustrated. As shown, the system comprises any number of users 701, any number of inventive collars 715, a cellular service 705, one or more satellite location services 710, and a server 730. As shown each of the components may be connected via a network 720 (e.g., Internet, LAN, cellular, intranet, etc.). Of course, many configurations are possible, and any of the components may be connected directly to any of the others via a wired or wireless connection.

In one embodiment, an animal monitoring program and/or a animal monitoring platform may be entirely or partially implemented on one or more servers 730 comprising hardware 740 such as any number of processors 742, RANI 743 and internal or external memory 744. The server may include a network interface 741 such that it may access the network 720 to send or receive information.

As shown, at least one database 731 may be accessed by the server 730. The database may include a number of tables 732. The database may be internal to the server or may be accessed by the server over a network or via another wired or wireless connection.

The server 730 may store desired or required information in the database 731 (such as the animal information, environment information and/or system information discussed above) and may access the same to retrieve the information. The database may also store identification information (e.g., username, password), user preference information, user contact information, etc. In one embodiment, the database may also store billing information and administrative privileges information.

A unique animal identification code may serve as a primary key with respect to an animal's electronic records and allows records to be easily associated with a particular animal. The code may be stored in the database and may be accessible via an internet-connected device.

The database 731 may be in communication with an object relational mapping ("ORM") 733, also known as an object relational model or object-relational database management system. The ORM may be in communication with one or more of a Universal Resource Indicator (URI) mapper 735 and a RestAPI generator 734. First, the URI mapper may map a URI into a pointer to an internal program, view, logic, or presentation of data within the system, based on one or more rules of a matching object specified in a collection of mapping objects. The matching object may be a regular expression. The URI mapper may be in communication with a web server 736.

The Rest API generator 734 may be in communication with a web server 736 as to send and/or receive data to/from computing devices 701 communicating with the server 730 using HTTP and/or HTTPS. The Rest API generator 734 may prepare data stored in the database for delivery to a client device or may prepare data received from a client device for storage in the database. The Rest API may be capable of translating between formats including, but not limited to JSON, XML, CSV, and the like. The Rest API may be capable of automatically generating URIs based upon data structures observed in the ORM for access by client devices.

A web server 736 may be adapted to deliver web pages (such as those discussed above with respect to a URL present on the collar (see FIG. 2 at 106) on request to users using the Hypertext Transfer Protocol (HTTP and/or HTTPS) or similar protocols. This allows for delivery of HTML documents and any additional content that may be included by a document, such as images, style sheets and scripts.

A user or client device may employ a web browser or similar client application to engage in communication with a web server. For example, a client application may make a request for a specific resource using HTTP/HTTPS and the web server may respond with the content of that resource or an error message if unable to do so. The resource may be data or a file stored in a database. The web server can receive content from a user 701 or from an animal collar 715, possibly using HTTP/HTTPS.

An exemplary client application may comprise HTML data, images, icons, and/or executable code. The executable code may be composed in JavaScript, ECMAscript, coffeescript, python, or other programming languages suitable for execution within the client application, or translation into a client application executable form.

The client application is typically adapted to present various user interfaces to a user. Such user interfaces may be based on information sent by the animal management program, and may allow the user to send and receive the above-described information to the animal management program. The client application may allow the user to create and/or manipulate data via various user interfaces, and to communicate the same to the server.

In certain embodiments, a user 701 may access the server 730 (i.e., an application running on the server) through a user access device connected to a network. A user access device may be any device capable of accessing the server such as by running a client application or other software, like a web browser or web-browser-like application. In one embodiment, a user access device may comprise, for example, an input/output device, a display, a processor, memory, and/or audio equipment. Exemplary user access devices include, but are not limited to, general purpose computers, laptops, cell phones, smart phones, personal digital assistants, televisions, tablets, and the like. Once an access device establishes a connection to the server, such as through the network, the user may log into the system and access the animal monitoring program.

Although the user device may usually have access to an Internet connection, transfers between the collar device and the user device do not require an Internet connection. A user device may access information stored on the collar device via a direct wired or wireless connection. In this case, the user device may receive data from the collar device and may store that data locally and/or may transmit such information to the server via the network.

In one exemplary embodiment, the user may enter one or more user preferences and/or settings into a mobile and/or desktop application in communication with the collar (directly or via a network). User preferences may include, for example, desired notifications and conditions for activation and/or adjustment of collar input and/or output devices (e.g., collar mode parameters, user notifications, third party notifications, additional user access to stored information, URL website preferences, etc.).

The server may be capable of populating database tables, with or without user interaction, by communicating with a collar device. For example, the server may connect, translate, aggregate, and/or convert information obtained from a collar device via the network. The server may be capable of communicating user-populated and/or automatically-populated database table entries to the collar device, and may notify users of such communications.

It will be recognized that any other suitable software or hardware or combinations thereof may be used with the exemplary document creation/editing and/or storage applications disclosed herein. Moreover, such applications may be implemented at any suitable location in FIG. 7, such as but not limited to at the server, the collar device, at the user access device or at a location not pictured.

Moreover, it will be apparent to one of ordinary skill in the art that, in certain embodiments, any of the functionality of the client may be incorporated into the server and/or the collar. Likewise, any functionality of a client application may be incorporated into a browser-based client, and such embodiments are intended to be fully within the scope of the invention. For example, a browser-based client application could be configured for offline work by adding local storage capability, and a native application could be distributed for various native platforms via software layer which executes the browser-based program on the native platform.

Although the collar is described herein as being adapted to be worn around the neck of an animal, it will be understood by those skilled in the art that the inventive features of the present invention may also be incorporated in a harness or other device configured to be worn by a pet. Moreover, while the collar has been described as being sized to be worn on a household pet, it will be understood that the present invention may also be adapted to be worn by any sized animal who can benefit from the numerous advantages provided by the collar.

In addition, while the collar has been described as being worn on an animal, it will be understood by those skilled in the art that the collar may be adapted to be worn or carried on the body of a human. For example, the device may be a wrist-worn or arm-mounted accessory such as a watch or bracelet. In other embodiments the device may take the form of a clip, pendant, anklet, belt, etc. that is adapted to be worn on the body of a human, clipped or mounted to an article of clothing, deposited in clothing (e.g., shirt or pants pocket), or deposited in an accessory (e.g., backpack or handbag).

From the foregoing description, it will be recognized by those skilled in the art that a wearable device having a rechargeable power source, for use in monitoring an animal's activity and surroundings; increasing visibility of the collar and safety for the animal; retrieving, modifying, and storing animal/owner information; and tracking an animal's movement and location has been provided. While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention it its broader aspects is therefore not limited to the specific details, representative apparatus and methods, and illustrative embodiments shown and described. Accordingly, departures may be made from such details without departing from the spirit or scope of applicant's general inventive concept.

Unless specifically stated otherwise, as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a flash memory device, such as a compact flash card or USB flash drive.

Some exemplary embodiments described herein are described as software executed on at least one computer, though it is understood that embodiments can be configured in other ways and retain functionality. The embodiments can be implemented on known devices such as a server, a personal computer, a special purpose computer, a programmed microprocessor or microcontroller and peripheral integrated circuit element(s), and ASIC or other integrated circuit, a digital signal processor, a hard-wired electronic or logic circuit such as a discrete element circuit, or the like. In general, any device capable of implementing the processes described herein can be used to implement the systems and techniques according to this invention.

It is to be appreciated that the various components of the technology can be located at distant portions of a distributed network and/or the internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements.

The invention described and claimed herein is not to be limited in scope by the specific embodiments herein disclosed since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

It will be apparent to one of ordinary skill in the art that the examples provided herein involving specific programming languages, typesetting languages, document formats, document types, specific software or programs, and other details are exemplary and that variations on any of these details are aspects of and are intended to be within the scope of the present invention.

We claim:

1. A wearable collar apparatus for monitoring an animal comprising:
　a collar body adapted to be worn about a neck of an animal, the collar body comprising:
　　a first end comprising a connection means;
　　a second end comprising a complementary connection means adapted to interface with the connection means of the first end such that the first end and second end are removably connected during wear;
　　an inner surface that faces the animal's neck during wear, the inner surface extending from the first end to the second end;
　　an outer surface that faces away from the animal's neck during wear, the outer surface comprising:
　　　a module dock disposed therein, the module dock adapted to receive a removable module therein and comprising:
　　　　a bottom wall;
　　　　a first side wall extending from the outer surface of the collar body to the bottom wall;
　　　　a second side wall extending from the outer surface of the collar body to the bottom wall, wherein the second side wall comprises a physical attachment means adapted to interface with a complementary physical attachment means of the removable module; and
　　　　wherein the second side wall further comprises an electrical attachment means adapted to interface with a complementary electrical attachment means of the removable module; and
　　an internal housing comprising first electronic components seated at least partially therein, the first electronic components comprising:
　　　a processor;
　　　an internal memory in communication with the processor;
　　　a cellular communication device in communication with the processor and the internal memory, the cellular communication device adapted to receive and transmit first location information;
　　　at least one satellite communication device in communication with the processor and the internal memory, the at least one satellite communication device adapted to receive and transmit second location information;
　　　one or more sensors in communication with the processor, the one or more sensors adapted to monitor one or more of: animal information, environment information and system information;
　　　a first rechargeable battery in communication with the processor; and
　　　a plurality of lights in communication with the processor, the lights extending from the internal housing through the outer surface of the collar body;
　a removable module removably seated within the module dock of the collar body, the removable module comprising:
　　a module housing comprising:
　　　a first module side wall and a second module side wall,
　　　　wherein one of the module side walls comprises:
　　　　　the complementary electrical attachment means interfacing with the electrical attachment means of the module dock; and
　　　　　the complementary physical attachment means interfacing with the physical attachment means of the module dock;
　　　a module outer surface extending from the first module side wall to the second module side wall;
　　　a module inner surface extending from the first module side wall to the second module side wall; and
　　second electronic components comprising:
　　　an activator located on the module outer surface;
　　　a display located on the module outer surface;
　　　a memory port located on the module inner surface;
　　　a second rechargeable battery disposed within the module housing; and
　　　one or more transceivers disposed within the module housing and adapted to communicate with a computing device,
　　　　wherein the one or more transceivers are selected from the group consisting of: a WiFi transceiver, an NFC transceiver, and a Bluetooth transceiver, and wherein the first electronic components of the module dock are in electrical communication with the second electronic components of the removable module via the electrical attachment means and the complementary electrical attachment means.

2. A wearable collar apparatus according to claim 1, wherein the one or more transceivers comprise the NFC transceiver and the Bluetooth transceiver.

3. A wearable collar apparatus according to claim 1, wherein the second electronic components further comprise a data port located on at least one of the module side walls for connecting the removable module to the computing device to charge the removable module and/or transmit information between the computing device and a removable memory device seated within the memory port.

4. A wearable collar apparatus according to claim 1, wherein the memory port is adapted to receive a removable memory device selected from the group consisting of: a subscriber identity module (SIM) card and a secure digital (SD) memory card.

5. A wearable collar apparatus according to claim 1, wherein the second electronic components of the removable module further comprise a wireless charging device adapted to allow wireless charging of the second rechargeable battery.

6. A wearable collar apparatus according to claim 1, wherein the connection means of the first end and the complementary attachment means of the second end are selected from the group consisting of: magnets, clips, pins, buckles, clasps, snaps, hinges, buttons, complementary track members, complementary threaded members, tongue and groove members, hook and loop, hook and eye, and adhesives.

7. A wearable collar apparatus according to claim 1, wherein:
the physical attachment means of the module dock comprises a magnet; and
the complementary physical attachment means of the removable module comprises a complementary magnet.

8. A wearable collar apparatus according to claim 1, wherein the at least one satellite communication device comprises a GPS satellite device and an Iridium satellite device.

9. A wearable collar apparatus according to claim 1, wherein the cellular communication device is selected from the group consisting of: a GSM-type cellular device and a CDMA-type cellular device.

10. A wearable collar apparatus according to claim 1, wherein the internal memory is an electrically-erasable programmable read-only memory (EEPROM) device.

11. A wearable collar apparatus according to claim 10, wherein the EEPROM device is a flash memory device.

12. A wearable collar apparatus according to claim 1, wherein the plurality of lights comprise LEDS.

13. A wearable collar apparatus according to claim 1, wherein the activator and the display are present as an integrated component, and the display comprises one or more LEDS.

14. A wearable collar apparatus according to claim 1, further comprising:
a Universal Resource Locator (URL) imprinted on the inner surface or the outer surface of the collar body, the URL providing an address to a website comprising animal identification information.

15. A wearable collar apparatus according to claim 1, wherein the one or more sensors are selected from the group consisting of: accelerometers, gyroscopes, pedometers, magnetometers, proximity sensors, gravity sensors, pressure sensors, moisture sensors, temperature sensors, light sensors, heart rate sensors, and battery sensors.

16. A wearable collar apparatus according to claim 15, wherein:
the animal information comprises one or more of: identification information, health information, first location information, second location information, movement information, sleep information and owner information;
the environment information comprises information relating to one or more of: gravity, pressure, moisture, temperature, and light; and
the system information comprises one or more of: battery status, user account information and user settings.

17. A wearable collar apparatus according to claim 1, further comprising:
a removable clip attachment removably connected to the collar body via the connection means of the first end and the complementary connection means of the second end, the removable clip attachment comprising:
a third rechargeable battery; and
a wireless charging device,
wherein the removable clip attachment charges the first rechargeable battery.

* * * * *